(12) United States Patent
Koerner et al.

(10) Patent No.: US 6,314,939 B1
(45) Date of Patent: Nov. 13, 2001

(54) METHODS AND APPARATUS FOR CONTROLLING ENGINE OPERATION

(75) Inventors: Scott A. Koerner, Kenosha, WI (US); Gregory J. Binversie, Grayslake, IL (US); Todd D. Craft, Kenosha, WI (US)

(73) Assignee: Outboard Marine Corporation, Waukegan, IL (US)

( * ) Notice: Subject to any disclaimer, the term of this patent is extended or adjusted under 35 U.S.C. 154(b) by 0 days.

(21) Appl. No.: 09/266,572

(22) Filed: Mar. 11, 1999

(51) Int. Cl.$^7$ .................................................. F02D 41/00
(52) U.S. Cl. ..................... 123/430; 123/295; 123/300; 123/305
(58) Field of Search ..................... 123/295, 298, 123/299, 300, 305, 399, 402, 430, 480, 478, 491, 432

(56) References Cited

U.S. PATENT DOCUMENTS

| | | | | |
|---|---|---|---|---|
| 4,543,930 | * | 10/1985 | Baker ................................ | 123/299 |
| 4,641,617 | * | 2/1987 | Aoyama et al. .................... | 123/262 |
| 5,050,557 | * | 9/1991 | Ishida et al. ...................... | 123/432 |
| 5,078,107 | * | 1/1992 | Morikawa .......................... | 123/295 |
| 5,086,737 | * | 2/1992 | Watanabe et al. ................. | 123/295 |
| 5,094,210 | * | 3/1992 | Endres et al. ..................... | 123/432 |
| 5,333,583 | * | 8/1994 | Matsuura .......................... | 123/295 |
| 5,553,580 | * | 9/1996 | Ganoung .......................... | 123/308 |
| 5,603,301 | * | 2/1997 | Sakurai et al. .................... | 123/430 |
| 5,666,916 | * | 9/1997 | Fujieda et al. .................... | 123/295 |
| 5,755,198 | * | 5/1998 | Grob et al. ........................ | 123/295 |
| 5,832,901 | | 11/1998 | Yoshida et al. . | |
| 5,875,761 | * | 3/1999 | Fujieda et al. .................... | 123/399 |
| 5,894,726 | | 4/1999 | Monnier . | |
| 5,915,353 | * | 6/1999 | Matsumura ....................... | 123/298 |
| 5,937,822 | * | 8/1999 | Nakajima .......................... | 123/295 |
| 5,950,603 | | 9/1999 | Cook et al. . | |
| 5,954,023 | * | 9/1999 | Mizuno et al. .................... | 123/295 |
| 5,967,114 | * | 10/1999 | Yasuoka ........................... | 123/295 |
| 5,983,853 | * | 11/1999 | Roessler et al. .................. | 123/295 |

FOREIGN PATENT DOCUMENTS

| | | |
|---|---|---|
| 197 58 018 A1 | 7/1999 | (DE) . |
| 0 898 069 A2 | 2/1999 | (EP) . |
| 2 755 186 A1 | 10/1996 | (FR) . |
| 6330738 | 11/1994 | (JP) . |

* cited by examiner

*Primary Examiner*—John Kwon
*Assistant Examiner*—Hieu T. Vo
(74) *Attorney, Agent, or Firm*—Armstrong Teasdale LLP

(57) ABSTRACT

Engine control apparatus and methods for avoiding heavy soot production yet providing smooth engine acceleration and deceleration without significant engine RPM increases and decreases with small throttle movements are described. In one embodiment, once the fuel injection angle reaches the angle at which soot formation begins, one or more cylinders are controlled to operate with later injection angles and lower fueling, which results in lower torque production and lower soot formation, while at the same time the remaining cylinders are set to operate with advanced injection angles and higher fueling, which results in a homogenous mixture of air and fuel, higher torque, and also lower soot formation. Therefore, for a first range of throttle positions, all cylinders operate in the stratified combustion mode. When the soot zone is reached, as determined based on throttle position, then some or at least one of the cylinders operate in the homogenous combustion mode and some or at least one of the cylinders operate in the stratified combustion mode. Once all the cylinders have skipped over the soot zone injection angle, then all the cylinders operate in the homogenous combustion mode.

44 Claims, 5 Drawing Sheets

METHODS AND APPARATUS FOR CONTROLLING ENGINE OPERATION

BACKGROUND OF THE INVENTION

The invention relates generally to direct gasoline-injected internal combustion engines, and more particularly, to reducing soot formation and improving running quality of such engines.

Known internal combustion engines include a cylinder block having a crankcase. In a v-type engine, two banks of cylinders extend radially from the crankcase. Each cylinder bank in a v-type six cylinder engine, for example, has three cylinders. In addition, and in a direct gasoline injected engine, gasoline is injected directly into each cylinder.

The direct burning of gasoline droplets in a cylinder causes soot formation due to burning unvaporized gasoline in the cylinder, and poorer fuel-air mixture formation as compared to a homogenous charge engine. At idle speeds, soot formation and mixture formation are not significant because the injected fuel quantities are small as compared to the injected quantities at higher speeds, and because the gasoline droplets are small due to later injection timing into higher cylinder pressures. As the injection timing becomes earlier and fueling rates increase to a maximum rate just before the transition from stratified combustion to homogenous combustion, soot formation and mixture formation adversely impact engine operation.

Known engines typically are operated with a step jump in injection timing to avoid substantial soot generation and improve mixture formation. Particularly, at a predetermined engine RPM, a small movement in the throttle causes a step increase, rather than a smooth increase, in the engine RPM. The step increase in RPM provides that the engine converts from stratified combustion to homogeneous combustion with very little throttle movement, which facilitates reducing heavy soot formation and improves mixture formation.

In marine engines, although such a step increase engine RPM avoids heavy soot production and improves mixture formation, the step increase in engine RPM results in a potentially objectionable increase or decrease in boat speed with very little throttle movement. It would be desirable to provide methods and apparatus for engine operation so that heavy soot production is avoided yet allows smooth engine acceleration and deceleration without significant engine RPM increases and decreases with small throttle movements.

BRIEF SUMMARY OF THE INVENTION

These and other objects may be attained by engine control apparatus and methods wherein heavy soot production is avoided yet smooth engine acceleration and deceleration are provided without significant engine RPM increases and decreases with small throttle movements. In one embodiment, once the fuel injection angle reaches the angle at which soot formation begins, one or more cylinders are controlled to operate with later injection angles and lower fueling, which results in lower torque production and lower soot formation, while at the same time the remaining cylinders are set to operate with advanced injection angles and higher fueling, which results in a homogenous mixture of air and fuel, higher torque, and also lower soot formation.

Therefore, for a first range of throttle positions, all cylinders operate in a stratified combustion mode. When the soot zone is reached, as determined based on throttle position, then some or at least one of the cylinders operate in a homogenous combustion mode and some or at least one of the cylinders operate in a stratified combustion mode. Once all the cylinders have skipped over the soot zone injection angles, then all the cylinders operate in a homogenous combustion mode.

The above described control strategy is sometimes referred to herein as an injection angle skip strategy because the injection angles corresponding to the heavy soot formation zone are skipped. Rather than all cylinders being controlled to skip over the soot zone at one time with very little throttle movement, each cylinder is controlled to skip over the soot zone at different throttle positions. By controlling the cylinders to skip the injection angles corresponding to the soot zone as described above, heavy soot production is avoided yet smooth engine acceleration and deceleration are provided without significant engine RPM increases and decreases with small throttle movements.

DETAILED DESCRIPTION OF THE INVENTION

Figure 1:
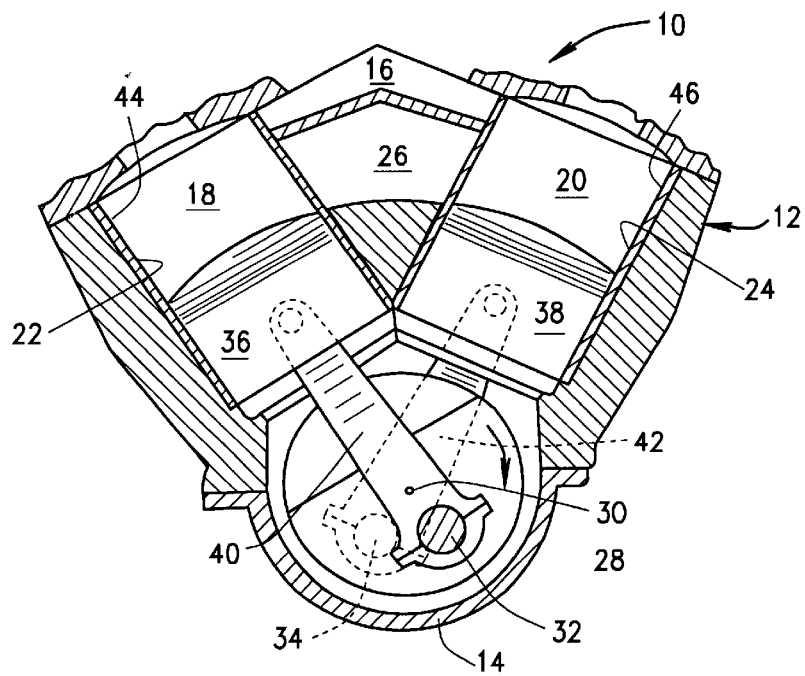
FIG. 1 is a schematic, partial cross-sectional illustration of a known internal combustion engine for marine use.

FIG. 1 is a schematic, partial cross sectional illustration of a portion of a known direct-injected internal combustion engine 10 for marine use. Engine 10 is shown schematically and primarily to describe one known engine configuration. The present invention is not limited to practice in engine 10, and can be used in connection with many other engine arrangements. For example, the present invention can be used in both two stroke and four stroke engines. Further, although the present invention is described herein in connection with a single fluid, pressure surge direct in-cylinder fuel injection system, the invention can be used in connection with many other fuel injection systems including, for example, dual fluid, air-assisted direct in-cylinder fuel injection systems.

In addition, and although the engine control apparatus and methods are described herein in the context of a marine engine, such apparatus and methods have utility, and may be used in connection with, direct-injected internal combustion engines for many other uses. Therefore, the present invention is not limited to practice in connection with marine applications, and can be used in many other applications.

Also, the terms "stratified combustion" and "homogenous combustion" as used herein are not limited to referring to pure stratified combustion and pure homogenous combustion. Generally, there is a transition between pure stratified and pure homogenous combustion. Therefore, the term stratified combustion refers both to pure stratified combustion and combustion which is more stratified than homogenous, and the term homogenous combustion refers to both pure homogenous combustion and combustion which is more homogenous than stratified.

Referring now to FIG. 1, engine 10 includes a cylinder block 12 having a crankcase 14. Cylinder block 12 also includes a main exhaust passageway 16 intermediate first and second cylinders 18 and 20 which extend radially from crankcase 14. Cylinders 18 and 20 include cylinder walls 22 and 24, respectively. Block 12 further includes a water passageway 26 intermediate cylinders 18 and 20.

A crankshaft 28 is supported in crankcase 14 for rotation about a crankshaft axis 30. Angularly spaced first and second crankpins 32 and 34 are coupled to crankshaft 28. Pistons 36 and 38 are connected to crankpins 32 and 34 by connecting rods 40 and 42. Pistons 36 and 38 are reciprocally movable in first and second cylinders 18 and 20 toward and away from crankshaft 28 and between top dead center and bottom dead center positions. Sleeves 44 and 46 are located in cylinders 22 and 24, and pistons 36 and 38 are in sliding contact with sleeves 44 and 46.

Figure 2:
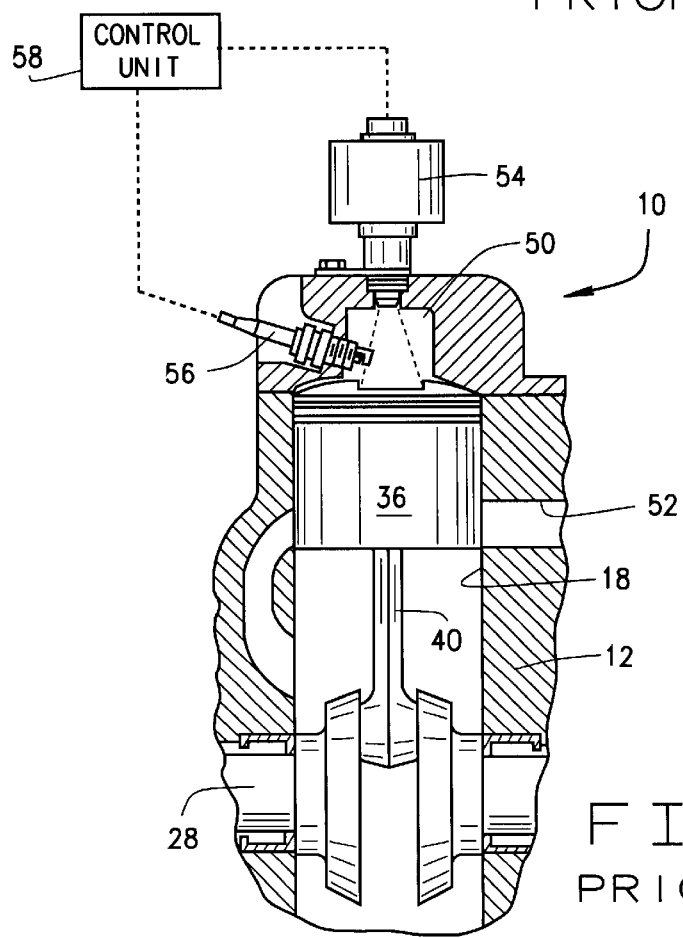
FIG. 2 illustrates a cylinder of the engine shown in FIG. 1.

FIG. 2 which illustrates, in more detail, cylinder 18 of engine 10. Cylinder 18 includes a combustion chamber 50, and an exhaust manifold 52 communicates with combustion chamber 50. A fuel injector 54 communicates directly with combustion chamber 50 and periodically injects fuel unmixed with air directly in chamber 50. A spark plug 56 extends into combustion chamber 50, and is operable to periodically ignite the fuel charges in combustion chamber 50. A control unit 58, which in one embodiment includes an electronic control unit, controls operations of injector 54 and spark plug 56. Additional details regarding the above described engine components are set forth, for example, in U.S. Pat. No. 5,730,099, which is assigned to the present assignee.

Figure 3:
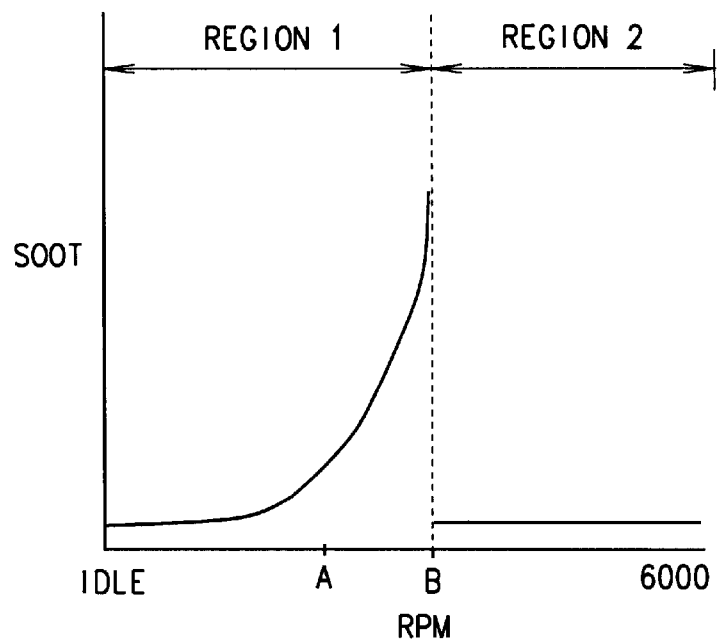
FIG. 3 is a graphical representation of engine RPM versus soot generation.

FIG. 3 is a graphical representation of engine RPM versus soot generation. Region 1 in FIG. 3 corresponds to stratified combustion, and region 2 corresponds to homogeneous combustion. As shown in FIG. 3, and at higher RPMs in the stratified combustion region, heavy soot is generated. The region from point A to point B in RPMs is sometimes referred to herein as the heavy soot production region, or the soot zone. Exemplary values for A and B are 1200 and 2000 RPM, respectively. When the engine initiates operation in the homogenous combustion mode, soot production returns to lower levels.

Figure 4:
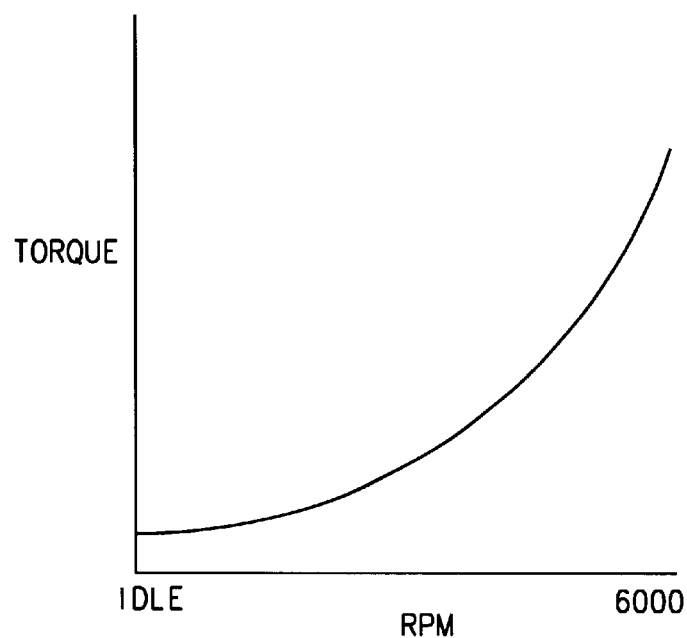
FIG. 4 is a graphical representation of RPM versus torque.

FIG. 4 is a graphical representation of RPM versus torque. Generally, in known engines, all cylinders contribute equal torque for engine operations. Specifically, each cylinder is operated identically to all other cylinders throughout the entire range of engine operation, i.e., in regions 1 and 2. Therefore, each cylinder contributes equally to the engine torque.

Figure 5:
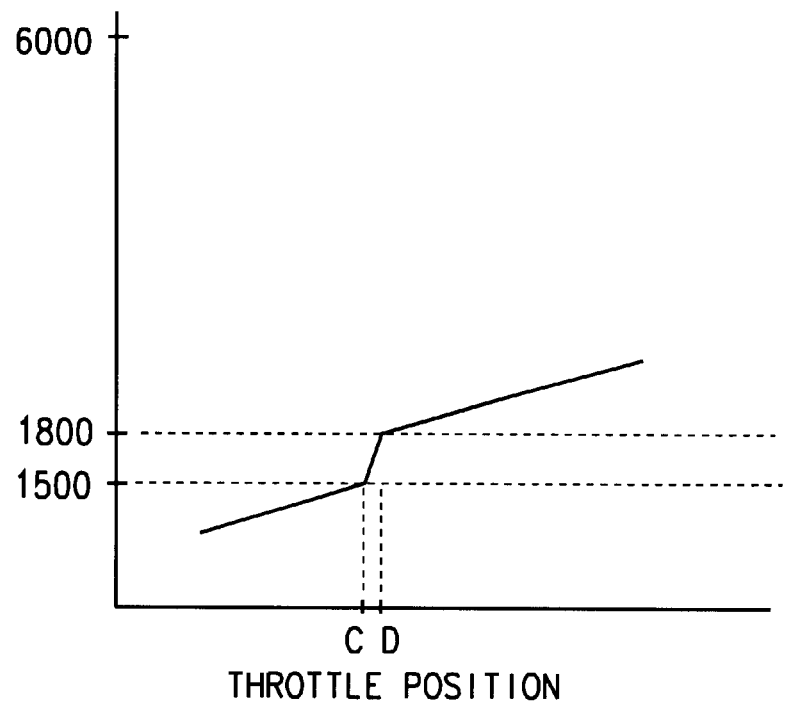
FIG. 5 is a graphical representation of throttle position versus RPM.

Referring to FIG. 5, and in accordance with a known strategy for reducing soot formation, a step increase in RPM is used to avoid the heavy soot formation zone. FIG. 5 is a graphical representation of throttle position versus RPM. As shown in FIG. 5, at about 1500 RPM, very small movement of the throttle from position C to position D results in a significant increase in RPM. Specifically, the RPM increases from 1500 RPM to 1800 RPM with a very small throttle push. Similarly, the RPM decreases from 1800 RPM to 1500 RPM with a very small throttle pull.

By utilizing the step increase/decrease from between 1500 RPM and 1800 RPM, at least a portion of the heavy soot formation zone is avoided. However, the step increase/decrease in engine RPM results in a potential significant increase or decrease in boat speed with very little throttle movement, which may be objectionable to some boat operators.

Figure 6:
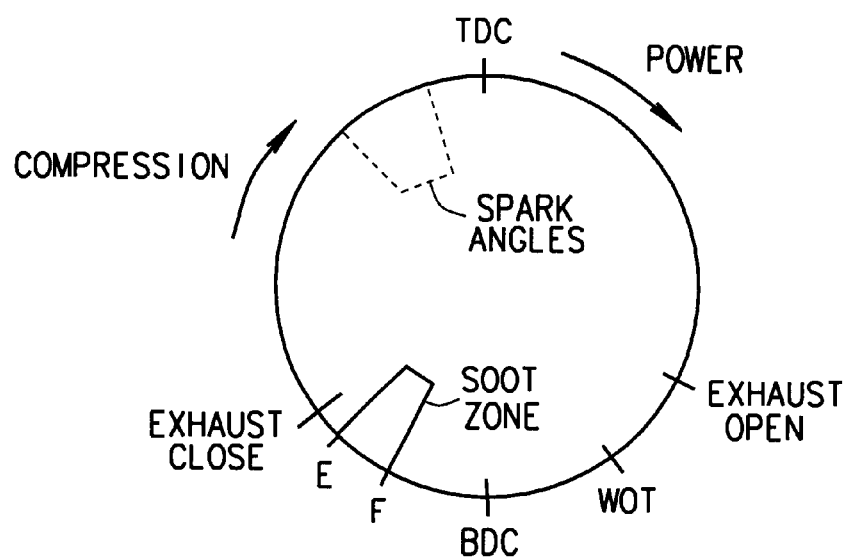
FIG. 6 is a graphical representation of one complete revolution of an engine crankshaft with respect to the location of a piston in a cylinder.

FIG. 6 is a graphical representation of one complete revolution of crankshaft 28 with respect to the location of piston 36 in cylinder 18 (FIG. 2), and illustrates in more detail the step function control strategy explained above in connection with FIG. 5. In FIG. 6, and starting with piston 36 located at top dead center (TDC), piston 36 is drawn toward crankshaft 28 in a power stroke. At a predefined angle from TDC, piston 36 moves below exhaust port 52 and exhaust port 52 is open so that exhaust can exit cylinder 18. Piston 36 then reaches bottom dead center (BDC) and begins moving away from crankshaft 28. The soot zone is located between BDC and the piston position at which exhaust port 52 is closed. The compression stoke then begins once exhaust port 52 is closed. Within the range of angles indicated in dashed lines as Spark Angles, control unit 58 energizes spark plug 56 so that a spark ignites the air-fuel mixture in combustion chamber 50.

Control unit 58 utilizes a map, or table, stored in memory to control fuel injection angles and spark angles based on throttle position. In one known engine, at idle speed, the pistons move from TDC to BDC and back to TDC in about 100 milliseconds. At 6000 RPM, the pistons move from TDC to BDC and back to TDC in about 10 milliseconds.

Fuel injector 54 injects fuel into chamber 50 for a time period of about 2 to 2.5 milliseconds. At wide open throttle (WOT), fuel is injected into chamber 50 at about 220° from TDC. Since the speed of the pistons decreases as the throttle is pulled back from WOT, the angle at which fuel is injected also decreases.

In accordance with the known step control, the engine fuel injection angle is controlled so that the soot zone is avoided. That is, the fuel injection angles for all the cylinders are the same, and when the throttle position is advanced to a position corresponding to an injection angle in the soot zone, all the cylinders are controlled so that the injection angle for each cylinder skips the soot zone at one time. Therefore, a small throttle push results in changing the fuel injection angle in all engine cylinders from angle E to angle F (FIG. 6). Such an increase in injection angle in all the engine cylinders results in a step increase in engine RPM which, as explained above, is not desirable.

The present invention, in one aspect, provides that heavy soot production is avoided yet allows smooth engine acceleration and deceleration without significant engine RPM increases and decreases with small throttle movements. Generally, and in accordance with the present invention, for a first set of throttle positions, the engine operates in a stratified combustion mode and the fuel injection angles in all the cylinders are the same. For a second set of throttle positions, the engine operates in a mixed stratified combustion and homogenous combustion mode in that the injection angles in at least one or some cylinders result in stratified combustion and the injection angles in at least one or some cylinders result in homogenous combustion. For a third set of throttle positions, the engine operates in a homogenous mode and the fuel injection angles in all the cylinders are the same. This engine control strategy is sometimes referred to herein as an injection angle skip strategy.

In one specific embodiment, up to throttle positions of 15.0% of wide open throttle, the injection angles in all the cylinders are the same, and the engine operates in a stratified combustion mode. Between throttle positions of about 15.0% and 27.5% of wide open throttle, one or more cylinders are controlled to operate with later injection angles and lower fueling, which results in lower torque production and lower soot formation, while at the same time the remaining cylinders are set to operate with advanced injection angles and higher fueling, which results in a homogenous mixture of air and fuel, higher torque, and also lower soot formation. Therefore, rather than operating all cylinders at the same fuel injection angle and fueling, at least one of the cylinders operates at a different injection angle than the other cylinders. That is, one cylinder may be operating at one end (e.g., injection angle F) of the soot zone and the other cylinders are operating at the other end (e.g., injection angle E) of the soot zone, rather than all cylinders operating with the same injection angle. Once the throttle position is advanced beyond 27.5% of wide open throttle, then all cylinders once again are operated at the same fuel injection angles and the engine operates in the homogenous combustion mode.

Figure 7:
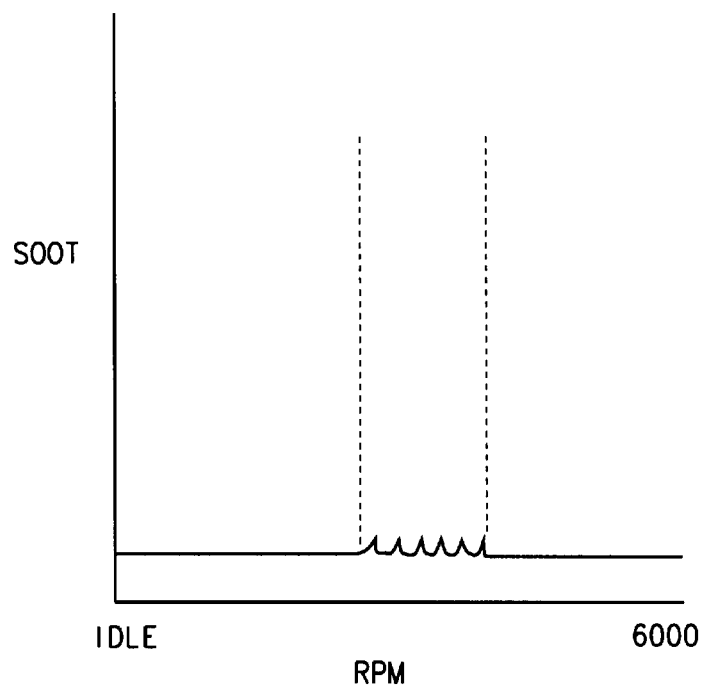
FIG. 7 is a graphical illustration of RPM versus soot using the injection angle skip strategy.

FIG. 7 is a graphical illustration of RPM versus soot using the above described injection angle skip strategy. Region A corresponds to stratified combustion, Region B corresponds to mixed stratified and homogenous combustion (e.g., some cylinders operating at stratified combustion and some cylinders operating at homogenous combustion), and Region C corresponds to homogenous combustion. As shown in FIG. 7, soot formation does not significantly increase in Region B as compared soot formation in Regions A and B because even in Region B, the injection angle for each cylinder is not in the heavy soot formation zone.

Figure 8:
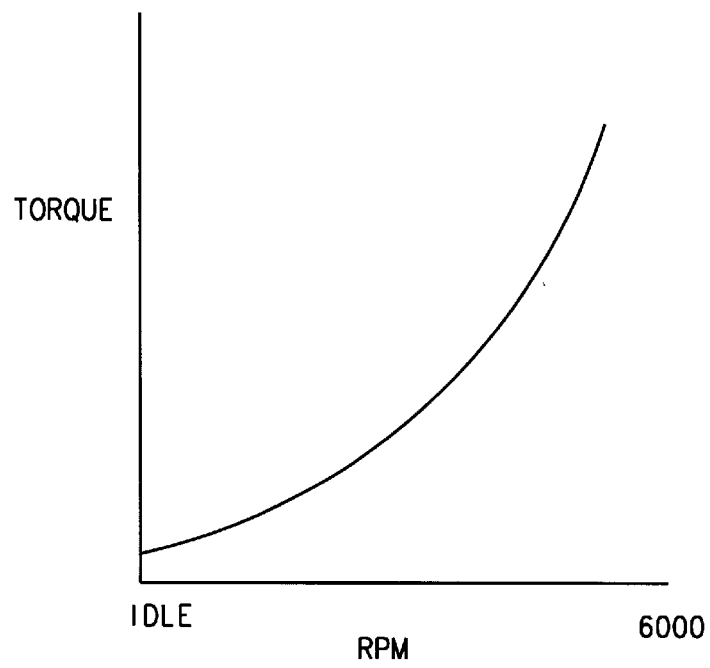
FIG. 8 is a graphical representation of RPM versus torque using the injection angle skip strategy.

FIG. 8 is a graphical representation of RPM versus torque using the above described injection angle skip strategy. Regions A, B, and C also are indicated in FIG. 8. In Regions A and C, all cylinders produce equal torque. In Region B, at least one cylinder produces a torque different from the torque produced by the other cylinders. However, the RPM versus torque curve is smooth.

Figure 9:
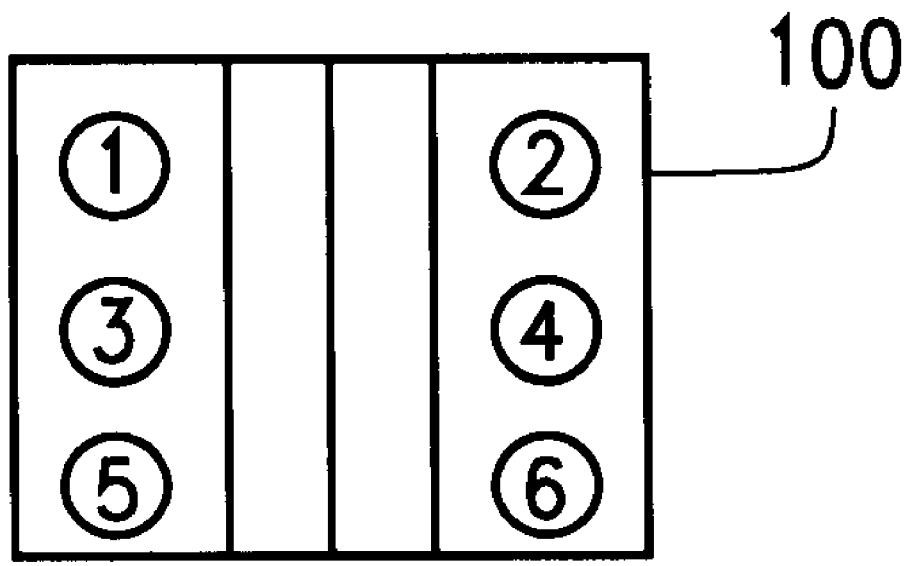
FIG. 9 is a schematic illustration of a v-type six cylinder engine block.

FIG. 9 is a schematic illustration of a v-type six cylinder engine block. Block includes six cylinder labeled 1–6. In one known engine, the soot zone is located at injection angles between about 80° and 110°. Therefore, and based on throttle position, each cylinder is separately controlled to skip the soot zone, i.e., skip from an injection angle of about 80° to an injection angle of about 110°.

The chart below illustrates the mapping used in one embodiment. The map for throttle positions, injection angles, spark injection angles, and fuel flow is stored in the memory of the control unit. During engine operations, the processor of the control unit utilizes the map to set, for example, the fuel injection angle for each cylinder based on throttle position.

| Throttle Position | Cylinder # |
| --- | --- |
| 15.0% | 3 |
| 17.5% | 5 |
| 20.0% | 1 |
| 22.5% | 4 |
| 25.0% | 6 |
| 27.5% | 2 |

Generally, and with the mapping set forth in the above chart, the engine operates in the stratified combustion mode with throttle positions up to about 15.0% of wide open throttle. For throttle positions between about 15.0% and 27.5% of wide open throttle, the engine operates in the mixed stratified and homogenous combustion mode. For throttle positions of 27.5% of wide open throttle and greater, the engine operates in the homogenous combustion mode.

More specifically, when the throttle position is at less than 15.0% of wide open, the control unit sets the fuel injection angle in all the cylinders at a same angle and the engine operates in the stratified combustion mode. When the throttle position reaches 15.0% of wide open, the control unit causes the fuel injection angle of cylinder 3 to skip from about 80° to 110°, and cylinder 3 operates in the homogenous combustion mode. The other cylinders, however, all remain at a fuel injection angle of 80° and operate in the stratified combustion mode.

When the throttle position is advanced to 17.5% of wide open, then the control unit causes the fuel injection angle of cylinder 5 to skip from about 80° to 110°. Therefore, with the throttle at 17.5% of wide open, cylinders 3 and 5 operate with fuel injection angles of 110° and in the homogenous combustion mode, and the other cylinders operate at a fuel injection angle of 80° and in the stratified combustion mode.

Each cylinder is controlled to skip over the heavy soot formation injection angles, i.e., injection angles between 80° and 110°, based on the throttle position as described above. When the throttle position reaches 27.5% of wide open, all cylinders operate at a fuel injection angle of 110° and in the homogenous mode.

Of course, many other mapping strategies are possible. For example, the number of cylinders that skip over the soot zone at particular throttle positions can be varied (e.g., more than one cylinder can skip the soot zone at one throttle position). In addition, the particular throttle positions and the particular injection angles skipped can vary from engine to engine. The particular injection angles to skip as well as the particular throttle positions at which such skips occur can be determined empirically. Further, rather than controlling when each cylinder skips from stratified to homogenous combustion based on throttle position, such control can be based on engine RPM. The above described injection angle skip strategy provides that heavy soot production is avoided yet allows smooth engine acceleration and deceleration without significant engine RPM increases and decreases with small throttle movements.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, as explained above, the present invention can be used in both two stroke and four stroke engines, and in connection with single fluid, pressure surge direct in-cylinder fuel injection systems, dual fluid, air-assisted direct in-cylinder fuel injection systems, and other injection systems. Accordingly, the spirit and scope of the invention are to be limited only by the terms of the appended claims.

What is claimed is:

1. In an internal combustion engine comprising a plurality of cylinders and a control unit, said control unit configured to operate at least one of said cylinders in a stratified combustion mode and at least one of said cylinders in a homogenous combustion mode over an engine operating range.

2. A control unit for an internal combustion engine including an engine block comprising a plurality of cylinders, a crankshaft, a plurality of pistons coupled to the crankshaft, each of the pistons located in one of the cylinders, a plurality of fuel injectors, each of the fuel injectors located to inject fuel into one of the cylinders, said control unit programmed to:

control the cylinders to operate in the stratified combustion mode for a first engine operating range; and control at least one cylinder to operate in the stratified combustion mode and at least one cylinder to operate in the homogenous combustion mode for a second engine operating range.

3. A control unit in accordance with claim 2 wherein said control unit is further programmed to control the cylinders in the stratified combustion mode for a first range of throttle positions.

4. A control unit in accordance with claim 3 wherein said control unit is further programmed to control at least one cylinder to operate in the homogenous combustion mode for a second range of throttle positions.

5. A control unit in accordance with claim 4 wherein said control unit is further programmed to control the cylinders in the stratified combustion mode for throttle positions between 0 to about 15% of wide open throttle.

6. A control unit in accordance with claim 4 wherein said control unit is further programmed to control at least one cylinder to operate in the homogenous combustion mode for throttle positions between about 15% to 27.5% of wide open throttle.

7. A control unit in accordance with claim 2 wherein said control unit is further programmed to control the cylinders in the stratified combustion mode for a first range of engine revolutions per minute.

8. A control unit in accordance with claim 7 wherein said control unit is further programmed to control at least one cylinder to operate in the homogenous combustion mode for a second range of engine revolutions per minute.

9. A control unit in accordance with claim 2 programmed to control the cylinders to operate in the homogenous combustion mode for a third predetermined condition.

10. A control unit in accordance with claim 9 wherein wherein said control unit is further programmed to control the cylinders to operate in the homogenous combustion mode for a third range of throttle positions.

11. A control unit in accordance with claim 10 wherein said control unit is further programmed to control the cylinders to operate in the homogenous combustion mode for throttle positions between about 27.5% to 100% of wide open throttle.

12. An internal combustion engine comprising an engine block comprising a plurality of cylinders, a crankshaft, a plurality of pistons coupled to said crankshaft, each of said pistons located in one of said cylinders, a plurality of fuel injectors, each of said fuel injectors located to inject fuel into one of said cylinders, and a control unit coupled to said fuel injectors and configured to control, over an engine operating range, at least one fuel injector to inject fuel into a first said cylinder at a first fuel injection angle and to control at least another fuel injector to inject fuel into a second said cylinder at a second injection angle, wherein at the first injection angle the first cylinder operates in a stratified combustion mode and wherein at the second injection angle the second cylinder operates in a homogenous combustion mode.

13. An engine comprising a plurality of cylinders, each of said cylinders capable of operating in a stratified combustion mode and a homogenous combustion mode, said engine configured to selectively operate in a mixed stratified and homogenous combustion mode wherein at least one cylinder is operated in said stratified combustion mode and at least one cylinder is operated in said homogenous combustion mode.

14. An engine in accordance with claim 13 wherein said engine further is configured to selective operate in a stratified combustion mode and a homogenous combustion mode.

15. An engine comprising a plurality of cylinders, each of said cylinders capable of operating in a stratified combustion mode and a homogenous combustion mode, said engine configured to operate in a plurality of modes over a plurality of operating ranges, said modes comprising a stratified combustion mode, a mixed stratified and homogenous combustion mode, and a homogenous combustion mode.

16. An engine in accordance with claim 15 wherein said engine is further configured to operate at least one cylinder in said stratified combustion mode and at least one cylinder in said homogenous combustion mode when in said mixed stratified and homogenous combustion mode.

17. An engine in accordance with claim 15 wherein said engine is configured to operate in said stratified combustion mode for a first engine operating range, in said mixed stratified and homogenous combustion mode for a second engine operating range, and in said homogenous combustion mode for a third engine operating range.

18. An engine in accordance with claim 17 wherein said engine is configured to operate in said stratified combustion mode for a first range of engine revolutions per minute, in said mixed stratified and homogenous combustion mode for a second range of engine revolutions per minute, and in said homogenous combustion mode for a third range of revolutions per minute.

19. An engine in accordance with claim 17 wherein said engine is configured to operate in said stratified combustion mode for a first range of throttle positions, in said mixed stratified and homogenous combustion mode for a second range of throttle positions, and in said homogenous combustion mode for a third range of conditions.

20. An engine in accordance with claim 19 wherein said engine is configured to operate in said stratified combustion mode for throttle positions between 0 to about 15% of wide open throttle, in said mixed stratified and homogenous combustion mode for throttle positions between about 15% to 27.5% of wide open throttle, and in said homogenous combustion mode for throttle positions between about 27.5% to 100% of wide open throttle.

21. An engine in accordance with claim 15 wherein said engine further comprises a plurality of fuel injectors for injecting fuel into said cylinders, said engine further configured to operate said fuel injectors to inject fuel into said cylinders at an angle less than a first predetermined angle when said engine is in said stratified combustion mode.

22. A engine in accordance with claim 15 wherein said engine further comprises a plurality of fuel injectors for injecting fuel into said cylinders, said engine further configured to operate at least one of said fuel injectors to inject fuel into at least one of said cylinders at a fuel injection angle less than a first predetermined angle and another one of said fuel injectors to inject fuel into another one of said cylinders at a fuel injection angle greater than a second predetermined angle when said engine is in said stratified and homogenous combustion mode.

23. An engine in accordance with claim 15 wherein said engine further comprises a plurality of fuel injectors for injecting fuel into said cylinders, said engine further configured to operate said fuel injectors to inject fuel into said cylinders at a fuel injection angle greater than a second predetermined angle when said engine is operated in said homogenous combustion mode.

24. A method for controlling operation of a direct-injected internal combustion engine, the engine including a plurality of cylinders and a plurality of fuel injectors, each one of the fuel injectors positioned to inject fuel into a respective one of the cylinders, the engine further including a crankshaft and a plurality of pistons coupled to the crankshaft, each one of the pistons positioned within one of the cylinders, said method comprising the step of:

controlling a first fuel injector to inject fuel into a first cylinder at a first injection angle for an engine operating range, wherein at the first injection angle the first cylinder operates in a stratified combustion mode; and controlling a second fuel injector to inject fuel into a second cylinder at a second injection angle for the engine operating range, wherein at the second injection angle the second cylinder operates in a homogenous combustion mode.

25. A method in accordance with claim 24 wherein said step of controlling a first fuel injector to inject fuel into a first cylinder at a first injection angle for the engine operating range comprises the step of controlling the first fuel injector to inject fuel into a first cylinder at a first injection angle for a range of throttle positions.

26. A method in accordance with claim 24 wherein said step of controlling a second fuel injector to inject fuel into a second cylinder at a second injection angle for an engine operating range comprises the step of controlling a second fuel injector to inject fuel into the second cylinder at a first injection angle over a range of revolutions per minute.

27. A method for controlling operation of an internal combustion engine, the engine including a plurality of cylinders, each of the cylinders capable of operating in a stratified combustion mode and a homogenous combustion mode, said method comprising the steps of:

controlling the cylinders to operate in the stratified combustion mode for a first engine operating range; and controlling at least one cylinder to operate in the stratified combustion mode and at least one cylinder to operate in the homogenous combustion mode for a second engine operating range.

28. A method in accordance with claim 27 wherein said step of controlling the cylinders to operate in the stratified combustion mode for a first engine operating range comprises the step of controlling the cylinders to operate in the stratified combustion mode over a first range of throttle positions.

29. A method in accordance with claim 28 wherein said step of controlling at least one cylinder to operate in the stratified combustion mode and at least one cylinder to operate in the homogenous combustion mode for a second engine operating range comprises the step of controlling at least one cylinder to operate in the stratified combustion mode and at least one cylinder to operate in the homogenous combustion mode over a second range of throttle positions.

30. A method in accordance with claim 29 wherein said step of controlling the cylinders to operate in the stratified combustion mode over a first range of throttle positions comprises the step of controlling the cylinders to operate in the stratified combustion mode between 0 to about 15% of wide open throttle.

31. A method in accordance with claim 29 wherein said step of controlling at least one cylinder to operate in the stratified combustion mode and at least one cylinder to operate in the homogenous combustion mode over a second range of throttle positions comprises the step of controlling at least one cylinder to operate in the stratified combustion mode and at least one cylinder to operate in the homogenous combustion for throttle positions between about 15% to 27.5% of wide open throttle.

32. A method in accordance with claim 27 wherein said step of controlling the cylinders to operate in the stratified combustion mode for a first engine operating range comprises the step of controlling the cylinders to operate in the stratified combustion mode over a first range of engine revolutions per minute.

33. A method in accordance with claim 32 wherein said step of controlling at least one cylinder to operate in the stratified combustion mode and at least one cylinder to operate in the homogenous combustion mode for a second engine operating range comprises the step of controlling at least one cylinder to operate in the stratified combustion mode and at least one cylinder to operate in the homogenous combustion mode over a second range of engine revolutions per minute.

34. A method in accordance with claim 27 further comprising the step of controlling the cylinders to operate in the homogenous combustion mode for a third engine operating range.

35. A method in accordance with claim 34 wherein said step of controlling the cylinders to operate in the homogenous combustion mode for a third engine operating range comprises the step of controlling the cylinders to operate in the homogenous combustion mode over a third range of throttle positions.

36. A method in accordance with claim 35 wherein said step of controlling the cylinders to operate in the homogenous combustion mode comprises the step of controlling the cylinders to operate in the homogenous combustion mode over a third ran e of throttle positions between about 27.5% to 100% of wide open throttle.

37. A method for controlling operation of an internal combustion engine, the engine including a plurality of cylinders, each of the cylinders capable of operating in a stratified combustion mode and a homogenous combustion mode, said method comprising the steps of:

controlling the engine to operate in the stratified combustion mode for a first range of throttle positions;

controlling the engine to operate in a mixed stratified and homogenous combustion mode for a second range of throttle positions; and controlling the engine to operate in a homogenous combustion mode for a third range of throttle positions.

38. A method in accordance with claim 37 wherein said step of controlling the engine to operate in the mixed stratified and homogenous combustion mode comprises the step of controlling at least one cylinder to operate in the stratified combustion mode and at least one cylinder to operate in the homogenous combustion mode.

39. A method in accordance with claim 37 wherein said step of controlling the engine to operate in the stratified combustion mode for the first range of throttle positions comprises the step of controlling the engine to operate in the stratified combustion mode for throttle positions between about 0 to about 15% of wide open throttle.

40. A method in accordance with claim 37 wherein said step of controlling the engine to operate in a mixed stratified and homogenous combustion mode for a second range of throttle positions comprises the step of controlling the engine to operate in a mixed stratified and homogenous combustion mode between about 15% to 27.5% of wide open throttle.

41. A method in accordance with claim 37 wherein said step of controlling the engine to operate in a homogenous combustion mode for the third range of throttle positions comprises the step of controlling the engine to operate in a homogenous combustion mode between about 27.5% to 100% of wide open throttle.

42. A method in accordance with claim 37 wherein said step of controlling the engine to operate in the stratified combustion mode for a first range of throttle positions comprises the step of controlling the fuel injection angle for each cylinder to be less than a first predetermined angle.

43. A method in accordance with claim 37 wherein said step of controlling the engine to operate in the mixed stratified and homogenous combustion mode for a second range of throttle positions comprises the steps of controlling the fuel injection angle for at least one cylinder to be less than a first predetermined angle and controlling the fuel injection angle for another one of the cylinders to be greater than a second predetermined angle.

44. A method in accordance with claim 37 wherein said step of controlling the engine to operate in a homogenous combustion mode for a third range of throttle positions comprises the step of controlling the fuel injection angle for each cylinder to be greater than a second predetermined angle.

* * * * *